(12) United States Patent
Nielsen et al.

(10) Patent No.: US 7,430,269 B2
(45) Date of Patent: Sep. 30, 2008

(54) ITERATIVE DATA RECONSTRUCTION

(75) Inventors: Tim Nielsen, Aachen (DE); Thomas Kohler, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 197 days.

(21) Appl. No.: 10/595,340

(22) PCT Filed: Oct. 4, 2004

(86) PCT No.: PCT/IB2004/051962

§ 371 (c)(1),
(2), (4) Date: Apr. 11, 2006

(87) PCT Pub. No.: WO2005/036466

PCT Pub. Date: Apr. 21, 2005

(65) Prior Publication Data

US 2007/0053556 A1    Mar. 8, 2007

(30) Foreign Application Priority Data

Oct. 14, 2003   (EP)   ................................. 03103790

(51) Int. Cl.
*H05G 1/60*   (2006.01)
(52) U.S. Cl. ........................................................ 378/4
(58) Field of Classification Search ............... 378/4–20, 378/901
See application file for complete search history.

(56) References Cited

U.S. PATENT DOCUMENTS 4,633,398 A * 12/1986 Gullberg et al. ............. 382/270
5,909,476 A * 6/1999 Cheng et al. .................... 378/4
6,426,988 B2 * 7/2002 Yamada et al. .................. 378/4
6,574,299 B1   6/2003 Katsevich
6,768,782 B1 * 7/2004 Hsieh et al. ..................... 378/8
6,987,829 B2 * 1/2006 Claus .......................... 378/23

FOREIGN PATENT DOCUMENTS

EP          0 502 187 B1     12/1997

OTHER PUBLICATIONS

Andersen et al., simultaneous Algebraic Reconstruction Technique (SART): A Superior Implementation of the ART Algorithm, Ultrasonic Imaging, vol. 6, pp. 81-84, 1984.*
Subbarao et al., Performance of Iterative Tomographic Algorithms Applied to Non-destructive Evaluation with Limited Data, NDT&E International, vol. 30, No. 6, pp. 359-370, 1997.*
Mueller et al., Rapid 3-D Cone-Beam Reconstruction with Simultaneous Algebraic Reconstruction Technique (SART) Using 2-D Texture Mapping Hardware, IEEE Transactions on Medical Imaging, vol. 19, No. 12, Dec. 2000, p. 1227-1237.*

(Continued)

*Primary Examiner*—Edward J Glick
*Assistant Examiner*—Alexander H Taningco

(57) ABSTRACT

Iterative algorithms, which may be used for image reconstruction, include alternating projections and backprojections usually have a slow convergence, due to correlations between simultaneously processed data. Consequently, a low image quality results. A filtering step is introduced before backprojection, allowing parallel processing without the loss of convergence speed or image quality. Advantageously, this allows several projections/backprojections to be performed simultaneously.

16 Claims, 2 Drawing Sheets

OTHER PUBLICATIONS

Chlewicki et al., 3D Simultaneous Algebraic Reconstruction Techinique for Cone-Beam Projections, University of Patras Faculty of Medicine, Department of Medical Phsics, 2001, pp. 1-57.*

Andersen, A.H., et al.; Simultaneous Algebraic Reconstruction Technique (SART); 1984; Ultrasonic Imaging; vol. 6 pp. 81-94.

Gordon, R., et al.; Algebraic Reconstruction Techniques (ART) for Three-Dimensional Electron Microscopy and X-Ray Photography; 1970; J. Theor. Biol.; 29: 471-481.

Herman, G.T., et al.; Algebraic Reconstruction Techniques Can Be Made Computationally Efficient; 1993; IEEE Trans. on Medical Imaging; 12(3)600-609.

Jiang, M., et al.; Convergency of the Simultaneous Algebraic Reconstruction Technique (SART); 2001; IEEE Trans. on Asilomar Conf. on Signals, Systems and Computers; 1(35)360-364.

Mueller, K., et al.; Rapid 3-D Cone-Beam Reconstruction with the (SART) Using 2-D Texture Mapping Hardware; 2000; IEEE Trans. on Med. Imaging; 19(12)1227-1237.

Schmidlin, P., et al.; Computation o High Overrelaxation Parameters in Iterative Image Reconstruction; 1998; IEEE Trans. on Nuclear Science; 45(3)(4)1737-1742.

Subbarao, P.M.V., et al.; Performance of iterative tomographic algorithms applied to non-destructive evaluation with limited data; 1997; NDT&E International; 30(6)359-370.

* cited by examiner

ITERATIVE DATA RECONSTRUCTION

The present invention relates to the field of iterative data reconstruction, e.g. in computed tomography. In particular, the present invention relates to a method of performing an iterative data reconstruction, to an image processing device and to a computer program for an image processing device.

Iterative methods can be used for data reconstruction in different fields of data processing, such as nuclear science and computed tomography. In particular, iterative algorithms are applied for image reconstruction. The reconstruction process consists of alternating projection and backprojection steps. In order to efficiently use dedicated image reconstruction hardware, multiple projections/backprojections have to be carried out simultaneously. In known methods, for example, as described in U.S. Pat. No. 5,253,171 or U.S. Pat. No. 6,574,299 B1, such image reconstruction still requires long processing times. In particular, the application of multiple projections/backprojections, which may be carried out simultaneously, may lead to a slow convergence, due to correlations between the simultaneously processed data and, consequently, to a low image quality.

It is an object of the present invention to provide for an improved iterative data reconstruction.

According to an exemplary embodiment the above object may be solved by a method of performing an iterative data reconstruction, wherein estimated projection data is determined from estimated data for a plurality of projections. Then, a difference between the estimated projection data and measured data is determined. Then, according to an aspect of the present invention, a filtering of the difference is performed, resulting in a filtered difference. Then, a backprojection is performed by updating the estimated data by using the filtered difference. These steps may be performed iteratively.

Due to the filtering step, the difference is adapted or manipulated before performing the backprojection. This may allow for an improved processing speed, i.e. for a reduced processing time. Furthermore, in case the method is applied, for example, for the reconstruction of images, an improved image quality may be achieved.

According to another exemplary embodiment the filtering is performed such that a mutual influence or reciprocal interaction of the plurality of projections is at least partially filtered out. In other words, according to this exemplary embodiment, the difference is modified such that an influence on a projection caused by other projections is compensated for before backprojection.

Advantageously, due to the introduction of such a filtering step, the method according to this exemplary embodiment of the present invention may be implemented efficiently, for example, on dedicated image reconstruction hardware and may allow to perform several projections/backprojections simultaneously, allowing for a reduced processing time.

According to another exemplary embodiment the method is based on the algebraic reconstruction technique (ART).

According to another exemplary embodiment, an image processing device is provided, performing an iterative data reconstruction, for example, similar to the ART, including a filtering before a backprojection, allowing for a reduced processing time, while still allowing for a high reconstruction quality.

The present invention also relates to a computer program, for example, for an image processing device, for performing an iterative data reconstruction, including a filtering step. The computer program according to the present invention is preferably loaded into a working memory of a data processor. The data processor is thus equipped to carry out the method of the invention. The computer program may be stored on a computer readable medium, such as a CD-ROM. The computer program may also be presented over a network, such as the WorldWideWeb, and may be downloaded into the working memory of the data processor from such a network.

In an exemplary embodiment, a filtering step is introduced into an iterative data reconstruction, such as ART or simultaneous ART (SART). ART is, for example, described in R. Gordon et al "Algebraic reconstruction techniques (ART) for three-dimensional electron microscopy and x-ray photography" J. Theor Biol. Vol. 29, pages 471 to 481, 1970, which is hereby incorporated by reference. SART is, for example, described in R. H. Andersen et al, "Simultaneous algebraic reconstruction technique (SART)" Ultrasonic imaging, Vol. 6, pages 81 to 94, 1994, which is hereby incorporated by reference. The filtering performed according to the present invention allows to filter out influences caused by other projections onto the current projection, which allows to improve the quality of the data reconstruction, i.e. in case images are reconstructed, it allows for an improved image quality. Furthermore, according to the present invention, several projections/backprojections may be performed simultaneously, allowing for a high processing speed.

These and other aspects of the present invention will become apparent from and elucidated with reference to the embodiments described hereinafter.

Exemplary embodiments of the present invention will be described in the following, with reference to the following drawings.

Figure 1:
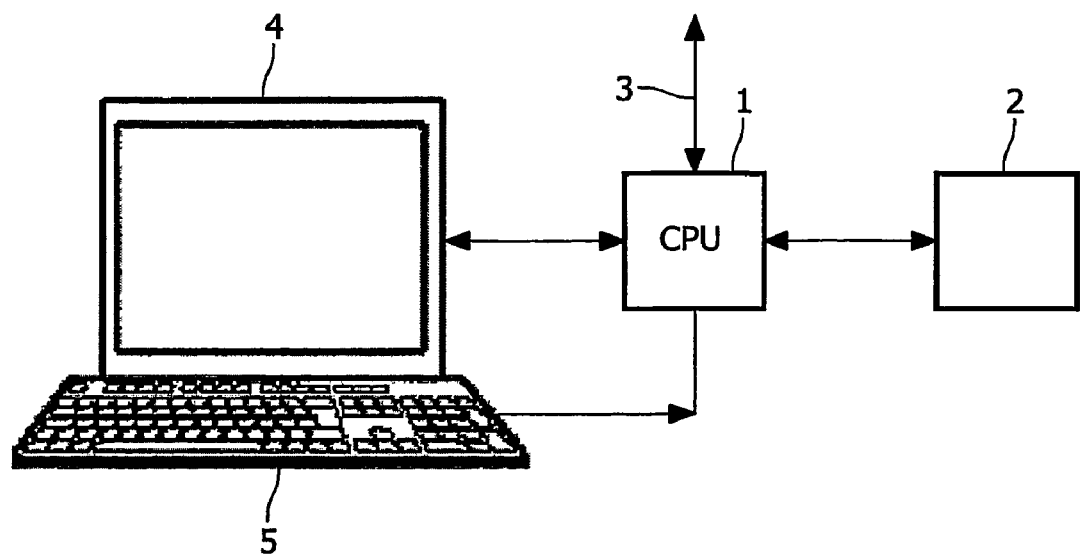
FIG. 1 shows a schematic representation of an image processing device according to an exemplary embodiment of the present invention, adapted to execute a method according to an exemplary embodiment of the present invention.

FIG. 1 depicts an exemplary embodiment of an image processing device according to the present invention, for executing an exemplary embodiment of a method in accordance with the present invention. The image processing device depicted in FIG. 1 comprises a central processing unit (CPU) or image processor 1 connected to a memory 2 for storing projection data and the data generated during the iterative data reconstruction. The image processor 1 may be connected to a plurality of input/output-network-or diagnosis—devices, such as an MR device, or a CT device. The image processor 1 is furthermore connected to a display device 4 (for example, to a computer monitor) for displaying information or images computed or adapted in the image processor 1. An operator may interact with the image processor 1 via a keyboard 5 and/or other output devices which are not depicted in FIG. 1.

The image processing device depicted in FIG. 1 may be operated on the basis of the ART reconstruction technique.

The basic idea of ART used according to the present invention is to use a discrete representation I of the continuous object function and to calculate projection data from it. I is modified, if there if a difference between the calculated projection data and the measured data.

Let the measured projection data p consist of X views $p_1, \ldots, p_X$.

One iteration step $k \mapsto k+1$ consists of two operations:

1: For a given view n(k) projection data p' is calculated from an estimated image $I_k$ and is compared with the measured data $p_{n(k)}$. (projection)

$$p' = P_{n(k)} I_k$$

$P_{n(k)}$ denotes the projection operator for view n(k).

2: The estimated image is updated depending on the observed difference between the measured and the calculated projection, resulting in a new estimate $I_{k+1}$. (backprojection)

$$I_{k+1} = I_k + \lambda_{n(k)} \cdot B_{n(k)} (p_{n(k)} - p')$$

$B_{n(k)}$ is the backprojection operator for view n(k).

n is the sequence in which the projection data from different views is processed (i.e. $n: N \mapsto \{1, \ldots, X\}$). $\lambda$ is a weighting factor that controls how much of the observed difference is backprojected into the new image.

A drawback of ART is that the computational effort is fairly high. This may be overcome by using a dedicated image reconstruction hardware, such as a dedicated CPU which can calculate several projections/backprojections simultaneously. As one iteration step in ART consists of one projection/backprojection pair, ART has to be modified to use several projections simultaneously. This leads to the simultaneous algebraic reconstruction technique (SART), which may be used to operate the image processing device depicted in FIG. 1.

In SART M projections/backprojections are processed simultaneously in each iteration step $k \mapsto k+M$:

1: Projection data $p'_j$ is calculated from an estimated image $I_k$ and compared with the measured data $p_{n(k+j)}$ for all $j \in [0, \ldots, M-1]$. (projection)

$$p'_j = P_{n(k+j)} I_k \; \forall j \in [0, \ldots, M-1].$$

Let $\Delta_j = \lambda_{n(k+j)} (p_{n(k+j)} - p'_j)$

2: The estimated image is updated depending on the observed difference between the measured and the calculated projection, resulting in a new estimate $I_{k+M}$. (backprojection)

$$I_{k+M} = I_k + \frac{1}{M} \cdot \sum_{j=0}^{M-1} B_{n(k+j)} \Delta_j$$

The factor 1/M in the backprojection step is due to the fact that projections from different angles partly contain the same information about the object. For example, all projections contain the dc value (overall average) of the object. While the factor 1/M is adequate for the dc component, it is too high for higher frequency components. This leads to slow convergence.

According to a preferred embodiment of the present invention, the image processing device depicted in FIG. 1 is adapted to perform the following method of operation, which is referred to in the following as filtered SART.

According to this exemplary embodiment of the present invention, a filtering step is introduced, which is performed before backprojection. Advantageously, the filtering may be adapted such that a mutual influence of the plurality of projections may be filtered out, thus allowing for an improved image quality. In other words, the slow convergence due to correlations between the simultaneously presented data may be significantly improved and thus the image quality may be improved. According to an exemplary embodiment of the present invention, the filtered SART may be described as follows:

Step 1: Projection

Projection data $p'_j$ is calculated from an estimated image $I_k$ and compared with the measured data $p_{n(k+j)}$ for all $j \in [0, \ldots, M-1]$. (projection)

$$p'_j = P_{n(k+j)} I_k \; \forall j \in [0, \ldots, M-1]$$

Let $\Delta_j = \lambda_{n(k+j)} (p_{n(k+j)} - p'_j)$

Step 2: Filtering:

Let $\tilde{\Delta}_0 \approx \Delta_0$ and $$\tilde{\Delta}_j = \Delta_j - P_{n(k+j)} \sum_{i=0}^{j-1} B_{n(k+i)} \tilde{\Delta}_i$$

$$j = 1, \ldots, M-1$$

It can be shown that one step of filtered SART gives the same result as M steps in ART.

As may be taken from Step 2, the filtering is performed such that a product of a projection of a current angle and an accumulation of backprojections of preceeding angles is subtracted from the difference image $\Delta_j$. Advantageously, as already indicated above, this allows to filter out influences of other projections on the current projection.

The above filtering step involves operations of the type $P_i B_j$. It should be noted that this is a mapping from projection space into projection space. The combined operation can be expressed analytically and discretized in a second step. This means, the backprojection and projection operations in Step 2 do not have to be carried out as such, in contrast to Steps 1 and 3. Only the much simpler combined operation $P_i B_j$ has to be carried out instead.

Depending on the system geometry, other simplifications may apply, for example, in the case of a CT system, it is obvious that $P_i B_j$ depends only on i−j.

Figure 2:
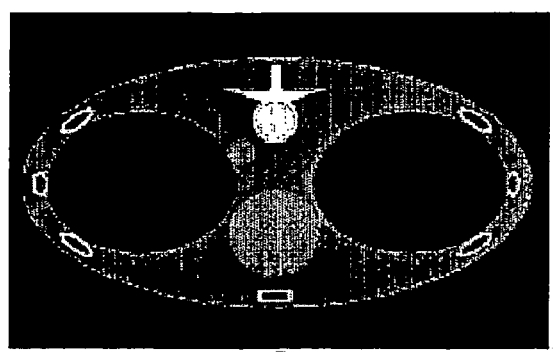
FIG. 2 shows a thorax phantom, reconstructed with one iteration of ART with $\lambda=1$.
Figure 3:
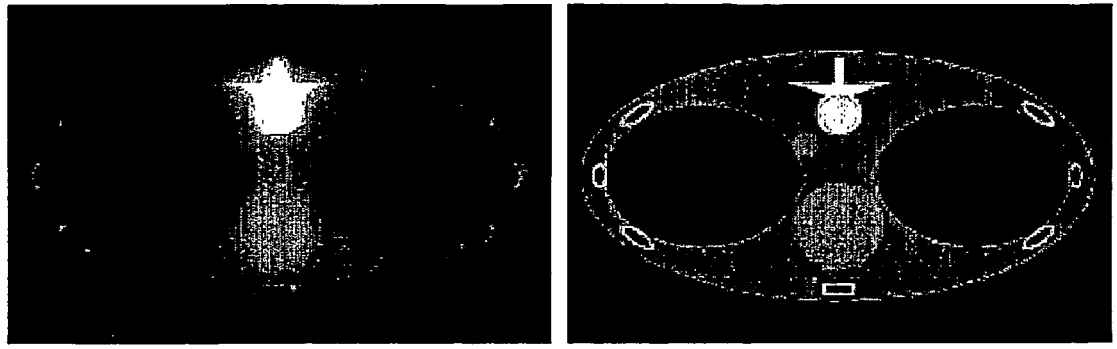
FIG. 3 shows a comparison of SART (left) and a reconstruction performed in accordance with an exemplary embodiment of the present invention (right) for M=32 (1 iteration, $\lambda=1$). Where M is the number of simultaneously processed views.
Figure 4:
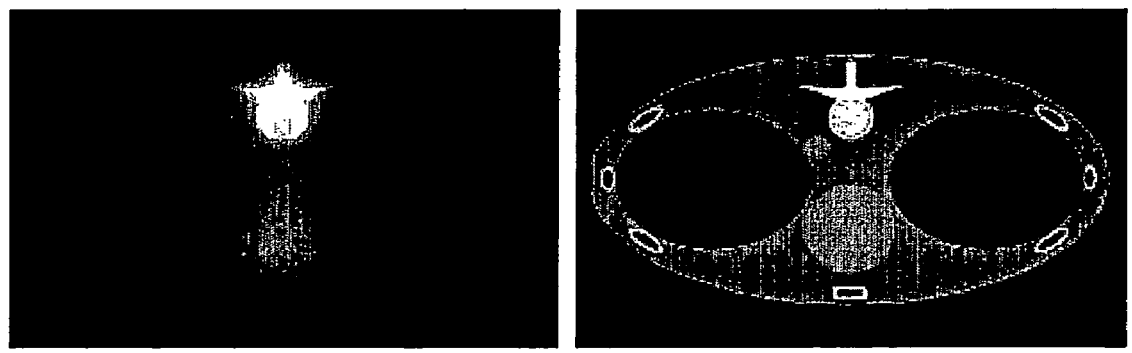
FIG. 4 shows another comparison of SART (left) and a reconstruction performed in accordance with an exemplary embodiment of the present invention (right) for M=64 (1 iteration, $\lambda=1$).

FIGS. 2 to 4 show images of a FORBILD thorax phantom reconstructed with ART, SART and filtered SART according to the present invention (hounsfield units, level=0, window=400). All images are the result of one iteration with a constant value of $\lambda=1$. FIG. 2 shows a thorax phantom reconstructed with one iteration of ART. FIG. 3 shows a comparison of SART (left) and filtered SART (right) for M=32. FIG. 4 shows a comparison of SART (left) and filtered SART (right) for M=64.

As may be taken in particular from the SART images on the left sides of FIGS. 3 and 4, the image quality of the SART images is worse than the image quality of the ART image depicted in FIG. 2. This is due to the conservative up-date weighting of 1/M. On the other hand, as may be taken from the filtered SART images on the right side of FIGS. 3 and 4, the filtered SART images have substantially the same or may even have an improved quality in comparison to the ART image depicted in FIG. 2.

As indicated above, the above described image processing device and method of performing an iterative data reconstruction may, in particular, be applied in computed tomography. However, it may also be applied in nuclear imaging or X-ray imaging.

The invention has been described with reference to the preferred embodiments. Modifications and alterations may occur to others upon reading and understanding the receding detailed description. It is intended that the invention be construed as including all such modifications and alterations insofar as they come within the scope of the appended claims or the equivalents thereof.

The invention claimed is:

1. Method of performing an iterative data reconstruction comprising the steps of:
   (a) determining estimated projection data from an estimated image for each of a plurality of projections of the estimated image, the plurality of projections each being along a corresponding one of a plurality of projection angles;
   (b) determining a projection data difference between the estimated projection data and measured data for each of the plurality of projection angles;
   (c) weighting the determined projection data difference for each of the projection angles;
   (d) filtering the weighted projection data differences to generate a filtered projection difference for each of the projection angles;
   (e) back-projecting the filtered projection differences to generate a correction image; and,
   (f) combining the correction image with the estimated image.

2. The method of claim 1, wherein steps (a)-(e) are iteratively performed and the filtering includes:
   combining the weighted projection data difference for each projection angle with projection data along the same projection angle from a combination of the correction images from prior iterations.

3. The method of claim 1, wherein the method is based on the algebraic reconstruction technique (ART).

4. The method of claim 1, wherein at least one of steps (a), (b), (c) and (d) is performed simultaneously for at least two projection angles of the plurality of projection angles.

5. The method of claim 1, wherein steps (a)-(e) are repeatedly performed and filtering includes:
   subtracting a projection of an accumulation of the preceding back-projection for each of the projection angles from the weighted projection data difference for the corresponding projection angle.

6. The method of claim 1, wherein the method is applied in computed tomography.

7. Image processing device, comprising:
   a memory for storing projection data; and
   an image processor for performing an iterative data reconstruction, wherein the image processor is configured to iteratively perform the following operation:
   (a) projecting $(P_{n(k+j)})$ estimated projections $(P_{n(k+j)})$ from an estimated data $(I_k)$ for a plurality of projection directions (M);
   (b) determining a difference $(\Delta_j)$ between the estimated determined projection $(P_{n(k+j)})$ and measured projections $(P'_j)$;
   (c) filtering the difference $(\Delta_j)$ for each of the projection directions (j) with a filter function $$\left( P_{n(k+j)} \sum_{i=0}^{j-1} B_{n(k+j)} \tilde{\Delta}_j \right)$$

derived from the differences $(\Delta_j)$ determined in prior iterations to generate a plurality of filtered difference$(\tilde{\Delta}_j)$; and
   (d) back-projecting $(B_{n(k+j)})$ the plurality filtered differences $(\tilde{\Delta}_j)$ and updating the estimated image using the back-projected filtered differences.

8. The image processing device of claim 7, wherein back-projecting the plurality of filtered differences generates a correction image and the processor is further configured to update the estimated image by:
   combining the correction image with the estimated image to generate an updated estimated image.

9. The image processing device of claim 7, wherein the image processor is further configured to:
   operate on the determined difference between the determined estimated projections and the measured projections with a weighting function $(\lambda_j)$.

10. The image processing device of claim 7, wherein the image processor is further configured to:
    iteratively repeat steps (a)-(d).

11. The image processing device of claim 7, wherein steps (a)-(e) are performed for a plurality of projection directions concurrently.

12. A computer readable medium encoded with a program for an image processing device comprising a processor, wherein the computer program stores computer program code that controls the processor to perform the following operations when the computer program is executed on the processor:
    performing an iterative data reconstruction comprising:
    (a) projecting estimated projections from an estimated image for a plurality of projection directions;
    (b) determining a difference between the estimated projections and corresponding measured projections;
    (c) filtering the differences resulting in a filtered difference;
    (d) back-projecting the filtered differences;
    (e) updating the estimated image with the back-projected filtered differences; and
    (f) generating an updated estimated image.

13. The computer program of claim 12 wherein the computer program further performs the following operations:
    backprojecting the plurality of filtered differences to generate a correction image:
    and updating the estimated image by:
    combining the correction image with the estimated image to generate an updated estimated image.

14. The computer program of claim 12, wherein the computer program further performs the following operations:
    operating on the determined difference between the determined estimated projections and the measured projections with a weighting function $(\lambda_j)$.

15. The computer program of claim 12, wherein the computer program further performs the following operations:
    iteratively repeating steps (a)-(e).

16. The computer program of claim 12, wherein steps (a)-(d) are performed for a plurality of projection directions concurrently.

* * * * *